United States Patent [19]

Schlatmann

[11] Patent Number: 5,764,313
[45] Date of Patent: Jun. 9, 1998

[54] FASTENING OF A PICTURE TUBE IN A CABINET OF A TELEVISION RECEIVER SET

[75] Inventor: Paul H. M. Schlatmann, Eindhoven, Netherlands

[73] Assignee: U.S. Philips Corporation, New York, N.Y.

[21] Appl. No.: 708,382

[22] Filed: Sep. 4, 1996

[30] Foreign Application Priority Data

Sep. 5, 1995 [EP] European Pat. Off. ............ 95202390

[51] Int. Cl.$^6$ .............................. H04N 5/72; H04N 5/645
[52] U.S. Cl. .................. 348/825; 348/830; 348/836; 348/843
[58] Field of Search ..................... 348/825, 826, 348/827, 830, 831, 836, 843

[56] References Cited

U.S. PATENT DOCUMENTS

| 2,559,353 | 7/1951 | Fisch | 177/316 |
| 2,684,477 | 7/1954 | Fisch | 340/367 |
| 2,738,500 | 3/1956 | Summerer | 340/367 |
| 3,084,217 | 4/1963 | Flore | 178/7.82 |
| 3,146,305 | 8/1964 | Monaco | 178/7.82 |
| 3,317,172 | 5/1967 | Balint | 248/316 |
| 3,404,228 | 10/1968 | McLeod, Jr. | 178/7.8 |

FOREIGN PATENT DOCUMENTS

| 1122178 | 7/1968 | United Kingdom | H01J 29/06 |

*Primary Examiner*—Thomas D. Lee
*Assistant Examiner*—Jerome Grant, II
*Attorney, Agent, or Firm*—Edward W. Goodman

[57] ABSTRACT

The fastening of a picture tube (1) in a cabinet (2) of a TV set, a bracket (13) and a support (4) of the cabinet is provided with mutually cooperating sawtooth arrangements (6, 21) such that, when the bracket is inserted into the support, the bracket is blocked in a direction opposed to the insertion direction (23). The bracket has a wall portion (16) which forms an abutment for a fastening hook (12) of the picture tube. A compensation of tolerances in picture tube dimensions is obtained by this construction.

5 Claims, 2 Drawing Sheets

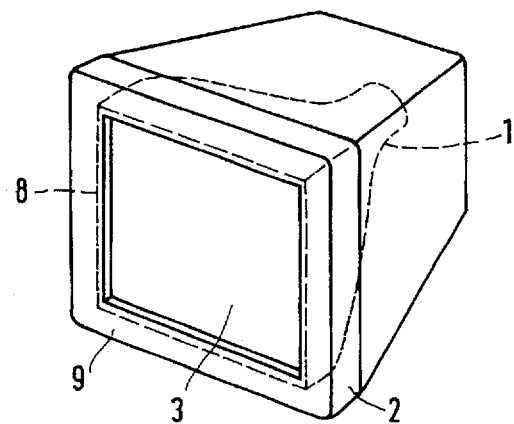
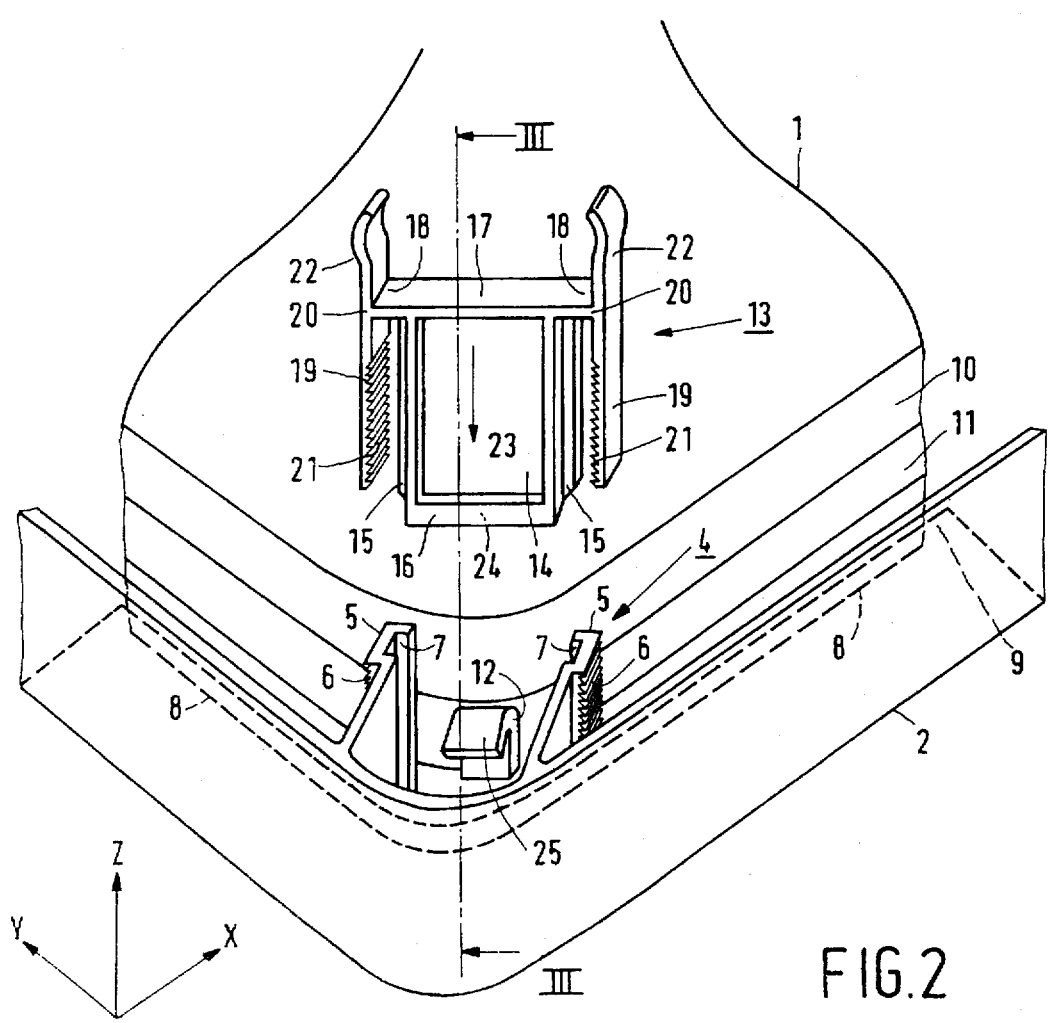

5,764,313

FASTENING OF A PICTURE TUBE IN A CABINET OF A TELEVISION RECEIVER SET

BACKGROUND OF THE INVENTION

The invention relates to a TV receiver set provided with a cabinet, a picture tube, and fastening means for fastening the picture tube in the cabinet, which means are formed by at least one support of the cabinet, a fastening hook of the picture tube, and a bracket which is fastened between the support and the hook.

FIELD OF THE INVENTION

Such a TV receiver set is known from GB-A-1,122,178. The hook is provided here with a number of adjustment grooves arranged in a row in which a fastening hook of the picture tube can be secured. The bracket is screwed into the cabinet. By hooking the fastening hook into the correct groove, it is possible to compensate for tolerances in the dimensions of the picture tube.

DESCRIPTION OF THE RELATED ART

The invention has for its object to provide a simple construction for fastening a picture tube in the cabinet of a TV set whereby a compensation for tolerances in the picture tube dimensions is obtained in a simple manner.

SUMMARY OF THE INVENTION

The invention is for this purpose characterized in that the support and the bracket each have a wall portion, these wall portions each being provided with a sawtooth arrangement, the bracket being capable of sliding into the support, while the sawteeth of the support and the bracket, in the inserted position of the bracket, cooperate with one another such that a blocking action is obtained in a direction opposed to the insertion direction, and in that the bracket is provided with a second wall portion which forms an abutment for the fastening hook of the picture tube.

After the picture tube has been placed in the cabinet, the bracket is simply inserted into the support, during which the teeth of the bracket and of the support grip into one another. Insertion of the bracket is effected over such a distance that the second wall portion of the bracket bears on the fastening hook of the picture tube under a certain pressure, thus securely fixing the picture tube. The bracket cannot move back due to the sawteeth. Such a fastening may be provided in various locations and in various directions. An automatic compensation of tolerances is obtained by the sawteeth. When the insertion direction is approximately perpendicular to the screen surface of the picture tube, the picture tube will be pressed again an inner edge of the framework of the cabinet. Usually, such a fastening will be present at each corner point of the picture tube.

Preferably, the support and the bracket each have two sets of wall portions with cooperating sawteeth, the wall portions of the bracket being situated on either side of a central portion of the bracket, which central portion comprises said second wall portion.

In a further embodiment, the wall portions of the bracket which are provided with a sawtooth arrangement are prolonged with an operational portion and are flexibly connected to the central portion of the bracket, the wall portions with the sawteeth being arranged at one side of the flexible connection and the operational portions at the other side of the flexible connection. The wall portions thus act as a kind of clothes pin, the flexible connection being resilient. It is accordingly possible, in a simple manner, to remove the bracket and thus take the picture tube from the cabinet for servicing.

Furthermore, the support and the bracket may be provided with guiding means for introducing the bracket into the support. The wall portions of the support may be provided, for example, with recesses into which the central portion of the bracket can slide. This not only facilitates the application of the bracket in the support, but, most of all, it also neutralizes the forces between the picture tube and the cabinet.

A preferred embodiment of the invention is characterized in that the fastening hook has a wall portion which serves as an abutment for the second wall portion of the bracket and which has a plane which encloses an angle of between 20° and 70° with the insertion direction of the bracket. Forces in all directions may be neutralized thereby.

BRIEF DESCRIPTION OF THE DRAWINGS

The invention will now be explained in more detail with reference to an embodiment shown in the drawings, in which:

FIG. 1 shows a TV receiver set in perspective view;

FIG. 2 shows the TV of FIG. 1 in perspective view, the fastening of a picture tube in the cabinet being depicted.

DESCRIPTION OF THE PREFERRED EMBODIMENT

Figure 3:
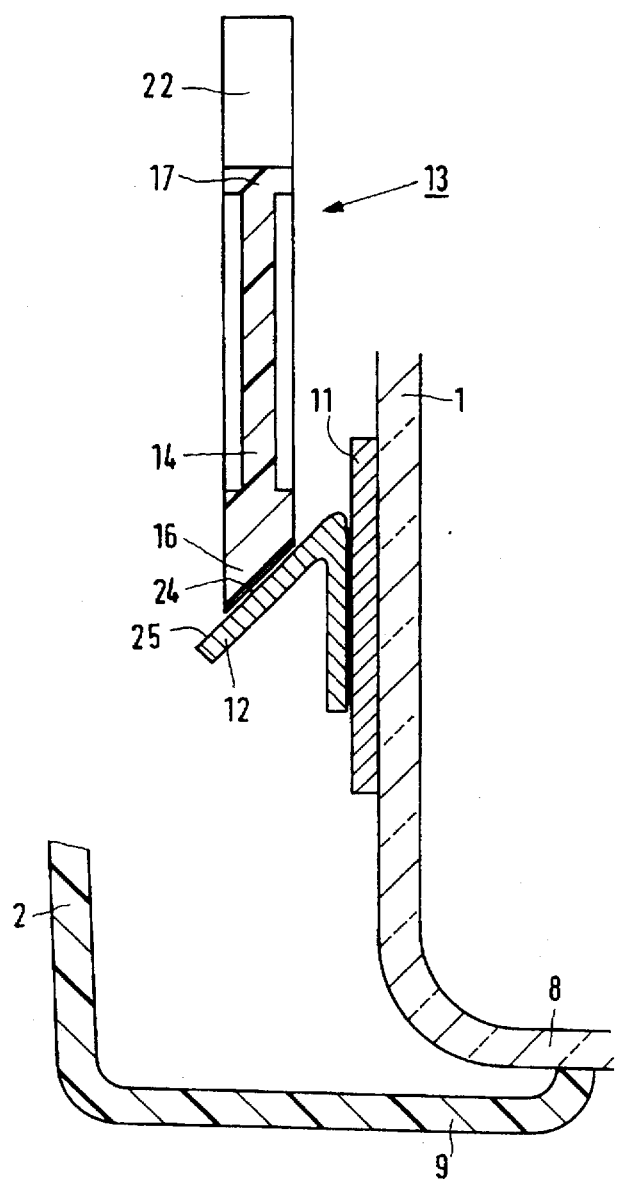
FIG. 3 is a cross-section taken on the line III—III in FIG. 2.

Reference numeral 1 denotes a picture tube of a TV set, and 2 denotes a cabinet in which the picture tube is fastened. In FIG. 2, the screen surface (front surface) 3 of the picture tube faces downwards. A support 4 is present at the inner side of the cabinet wall and is formed by two wall portions 5 mutually spaced apart and perpendicular to the screen surface 3 of the picture tube to be placed in the cabinet. The outer side of each wall portion 5 is provided with a sawtooth arrangement 6, and the inner side with a recess 7. The sawteeth and the recess are both oriented perpendicular to the screen surface 3. An edge portion 8 of the screen surface of the picture tube will lie against the inner edge of the cabinet front frame 9. The wall 10 of the picture tube is surrounded by a steel implosion-protection band 11. A fastening hook 12 is welded to this protection band. When the picture tube is placed in the cabinet, the fastening hook 12 will lie between the recesses 7. A bracket 13 is used for fastening the picture tube in the cabinet. The bracket has a central portion 14 with lateral edges 15, a lower wall portion 16 and an upper wall portion 17, the ends 18 thereof projecting beyond the lateral edges 15. The bracket is provided with wall portions 19 spaced away over some distance on either side of said lateral edges 15. These wall portions each have a sawtooth arrangement 21 facing the lateral edge 15. The wall portions 19 are prolonged each with an operational portion 22. The wall portions 19 are fastened to the ends 18 of wall portion 17 such that the wall portions 19 are perpendicular to the wall portions 17, the wall portions 19 with the sawteeth lying at one side of the ends 18 and the operational portion 22 at the other side of the ends 18. Thus the wall portions 19 have an elastic connection 20 to the upper wall portion 17 of the bracket. The bracket thus acts as a kind of clothes-peg.

To lock the picture tube 1 in the cabinet 2 in the Z-direction, the bracket 13 is arranged in the support 4 in that the lateral edges 15 of the central portion 14 of the bracket are introduced into the recesses 7 of the support in the insertion direction 23. The sawteeth 21 slide along the sawteeth 6 during this. The bracket is inserted into the support until the lower edge 24 of the wall portion 16 hits against the fastening hook 12. By pressing the bracket firmly home, it is achieved that the edge portion 8 of the screen 3 lies securely against the cabinet front frame 9. The sawteeth 21 cooperate with the sawteeth 6 such that a blocking action is obtained in a direction opposed to the insertion direction 23 of the bracket.

To compensate any forces between the picture tube and the cabinet satisfactorily, an abutment surface 25 of the fastening hook 12, against which the lower side 24 of the wall portion 16 of the bracket 13 presses, encloses an angle of between 20° and 70°, preferably approximately 45°, with the insertion direction 23 of the bracket (see FIG. 3). Forces are thereby compensated not only in the Z-direction, but also in the X- and Y-directions. The wall portion may be facing obliquely upwards or obliquely downwards here. The lower side 24 of the wall portion 16 may also assume an oblique position corresponding to that of the abutment surface 25, as is shown in FIG. 3.

It is obviously also possible to have the bracket 13 and the support 4 assume an oblique position relative to the screen surface 3 instead of a perpendicular position. In that case, however, the abutment surface 25 of the fastening hook 12 must be approximately perpendicular to the insertion direction 23 of the bracket. In this case the forces are again compensated in all directions.

If the picture tube is to be removed from the cabinet for servicing, the bracket may be simply removed from the support in that the operational portions 22 are pressed towards one another, whereby the blocking action of the sawteeth is eliminated.

I claim:

1. A television receiver set provided with a cabinet, a picture tube, and fastening means for fastening the picture tube in the cabinet, said fastening means being formed by at least one support connected to the cabinet, a fastening hook connected to the picture tube, and a bracket for cooperating with the support and the fastening hook, characterized in that the support and the bracket each have a wall portion, each of said wall portions being provided with a sawtooth arrangement, the bracket being capable of sliding into engagement with the support, while the sawtooth arrangements of the support and the bracket, in an engaged position of the bracket, cooperate with one another such that a blocking action is obtained in a direction opposed to an engagement direction, the bracket being provided with a second wall portion for forming an abutment for the fastening hook of the picture tube when said bracket is engaged with said support.

2. A television receiver set as claimed in claim 1, characterized in that the support and the bracket each have two sets of wall portions with cooperating sawtooth arrangements, the wall portions of the bracket being situated on opposite sides of a central portion of the bracket, said central portion comprising said second wall portion.

3. A television receiver set as claimed in claim 2, characterized in that the wall portions of the bracket which are provided with the sawtooth arrangements are extended with an operational portion and are flexibly connected to the central portion of the bracket, the wall portions with the sawtooth arrangements being situated at one side of the flexible connection and the operational portion at the other side of the flexible connection, whereby manipulation of said operational portions in opposition to said flexible connection disengages the blocking action of the sawtooth arrangements of the bracket and the support.

4. A television receiver set as claimed in claim 1, characterized in that the support and the bracket are provided with guiding means for introducing the bracket into the support.

5. A television receiver set as claimed in claim 1, characterized in that an abutment surface of the fastening hook, against which the second wall portion of the bracket presses, encloses an angle of between 20° and 70° with the insertion direction of the bracket.

* * * * *